US011195404B2

(12) United States Patent
Sifuna et al.

(10) Patent No.: US 11,195,404 B2
(45) Date of Patent: Dec. 7, 2021

(54) INTERPRETING REACTIONS OF OTHER PEOPLE FOR PHYSICALLY IMPAIRED DURING AN EMERGENCY SITUATION

(71) Applicant: International Business Machines Corporation, Armonk, NY (US)

(72) Inventors: Arphaxade Wanjala Sifuna, Nairobi (KE); Clifton Kipchirchir, Nairobi (KE); David W Kaguma, Nairobi (KE); Celia Cintas, Nairobi (KE); Komminist Weldemariam, Ottawa (CA); Joan Byamugisha, Johannesburg (ZA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/424,266

(22) Filed: May 28, 2019

(65) Prior Publication Data

US 2020/0380839 A1 Dec. 3, 2020

(51) Int. Cl.
*G08B 21/04* (2006.01)
*G08B 21/18* (2006.01)
*G08B 27/00* (2006.01)
*G06F 3/01* (2006.01)
*G06F 9/54* (2006.01)

(52) U.S. Cl.
CPC ............ *G08B 21/043* (2013.01); *G06F 3/011* (2013.01); *G06F 9/542* (2013.01); *G08B 21/182* (2013.01); *G08B 27/005* (2013.01); *G06F 2203/011* (2013.01)

(58) Field of Classification Search
CPC .. G08B 21/043; G08B 21/182; G08B 27/005; G06F 3/011; G06F 9/542; G06F 2203/011
See application file for complete search history.

(56) References Cited

U.S. PATENT DOCUMENTS

| 7,182,174 | B2* | 2/2007 | Parrini | B66B 5/022 |
| | | | | 182/18 |
| 7,667,609 | B1* | 2/2010 | Roe | G08B 21/04 |
| | | | | 340/576 |
| 8,044,772 | B1* | 10/2011 | Roe | B60K 28/06 |
| | | | | 180/272 |
| 8,351,297 | B2* | 1/2013 | Lauder | G01S 5/18 |
| | | | | 367/128 |

(Continued)

OTHER PUBLICATIONS

Mel, et al. "The NIST Definition of Cloud Computing". Recommendations of the National Institute of Standards and Technolcoy. Nov. 16, 2015.

*Primary Examiner* — Adnan Aziz
(74) *Attorney, Agent, or Firm* — Shimon Benjamin, Esq.; McGinn I.P. Law Group, PLLC.

(57) ABSTRACT

A method, system and apparatus of for guiding a physically impaired individual during an emergency, including receiving emergency data, determining or predicting the reactions of other people in response to the emergency data, interpreting in real-time the reactions of the other people to physically impaired person according to the impaired person profile, determining a type and modality of aid services to the physically impaired, and prompting the physically impaired person through one or more devices for aid services.

17 Claims, 11 Drawing Sheets

(56) References Cited

U.S. PATENT DOCUMENTS

| | | | |
|---|---|---|---|
| 9,316,502 B2* | 4/2016 | Moore | H04N 13/239 |
| 9,541,625 B2* | 1/2017 | McSheffrey | H04W 64/006 |
| 9,754,465 B2* | 9/2017 | Gordon | G08B 7/06 |
| 10,531,266 B2* | 1/2020 | Rauner | G08B 25/10 |
| 2003/0006898 A1* | 1/2003 | Herzberg | G08B 21/22 |
| | | | 340/540 |
| 2011/0172907 A1* | 7/2011 | Rui Da Silva Freitas | |
| | | | G09B 5/125 |
| | | | 701/533 |
| 2011/0241877 A1* | 10/2011 | Wedig | G08B 7/066 |
| | | | 340/540 |
| 2013/0120137 A1* | 5/2013 | Lehmann | G08B 7/066 |
| | | | 340/524 |
| 2015/0116106 A1* | 4/2015 | Fadell | G08B 19/005 |
| | | | 340/501 |
| 2015/0330787 A1* | 11/2015 | Cioffi | G06Q 30/0261 |
| | | | 701/537 |
| 2016/0063893 A1* | 3/2016 | Kanuganti | H04N 21/25841 |
| | | | 348/62 |
| 2017/0024839 A1* | 1/2017 | Klein | H04W 4/90 |
| 2017/0030720 A1* | 2/2017 | Moore | G01C 21/206 |
| 2017/0221326 A1 | 8/2017 | Wedig et al. | |
| 2017/0311131 A1* | 10/2017 | South | H04W 4/30 |
| 2018/0053394 A1 | 2/2018 | Gersten | |
| 2018/0133583 A1* | 5/2018 | Tran | A63B 24/0075 |
| 2019/0007819 A1 | 1/2019 | Marchiol et al. | |
| 2019/0073894 A1 | 3/2019 | Mehta et al. | |
| 2019/0197863 A1* | 6/2019 | Kao | G08B 21/0272 |
| 2020/0051189 A1* | 2/2020 | Williams | H04W 4/029 |
| 2020/0117900 A1* | 4/2020 | Deng | H04W 4/02 |

\* cited by examiner

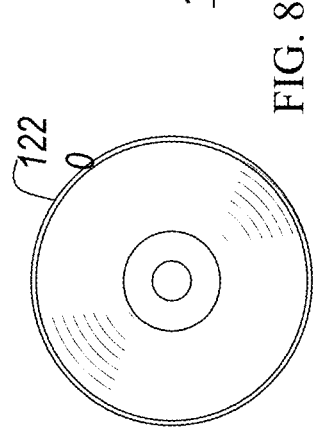
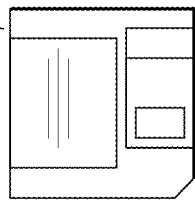
FIG. 8

INTERPRETING REACTIONS OF OTHER PEOPLE FOR PHYSICALLY IMPAIRED DURING AN EMERGENCY SITUATION

BACKGROUND OF THE INVENTION

Field of the Invention

The disclosed invention relates generally to an embodiment of a method and system for interpreting reactions, and more particularly, but not by way of limitation, relating to a method, apparatus, and system for interpreting reactions of other people for physically impaired during an emergency situation.

Description of the Background Art

The numbers on physically impaired (including both hearing and vision impaired) people vary because there is no universal definition that is accounted for. For example, in the United States, blindness is defined as "central visual acuity of 20/200 or less in the better eye with the use of a correcting lens." Arguably, "the National Federation of the Blind estimates that there are around 7 million Americans with a visual disability and according to WHO there are over 285 million visually impaired people worldwide." Thus, there is a very large population who could benefit from smart assistive devices and their associated technologies.

Physically impaired people are part of the workforces and are in any other places like other people and hence they require some level of aid or companions. There is a lot of work and research being done to find ways to improve life for physically impaired people. Hearing, reading and recognition devices could make sensors, smartphones, tablets and smart glasses (powered by AI systems) into indispensable companions for the physically impaired.

One particular area that has been the subject of several decades is how to ensure real-time aid to physically impaired people during an emergency situation. Beyond providing real-time aids, that has been attempts made to equip physically impaired people. There is a need to quickly and instantaneously self-respond to typical emergency alarm systems installed at workplaces, other sites (e.g., shopping malls, restaurants, etc.) and other buildings in real-time and correctly as opposed to being left behind under emergency instances (e.g., fire).

Therefore, there is a need to provide a device, system and a method of efficiently aiding an impaired individual, especially during emergency situations.

SUMMARY OF INVENTION

In view of the foregoing and other problems, disadvantages, and drawbacks of the aforementioned background art, an exemplary aspect of the disclosed invention provides a method, apparatus, and system for method, apparatus, and system for interpreting reactions of other people for physically impaired during an emergency situation.

One aspect of the present invention is to provide a method for guiding a physically impaired individual during an emergency, including receiving first emergency data, determining or predicting the reactions of other people in response to the emergency data, interpreting in real-time the reactions of the other people to physically impaired person according to the impaired person profile, determining a type and modality of aid services to the physically impaired, and prompting the physically impaired person one or more device for aid services.

Another aspect of the present invention provides a system for guiding, including a memory storing computer instructions, and a processor configured to execute the computer instructions to receiving first emergency data, determining or predicting the reactions of other people in response to the emergency data, interpreting in real-time the reactions of the other people to physically impaired person according to the impaired person profile, determining a type and modality of aid services to the physically impaired, and prompting the physically impaired person one or more device for aid services.

Another example aspect of the disclosed invention is to provide a computer program product comprising a computer readable storage medium having program instructions embodied therewith, the program instructions readable and executable by a computer to cause the computer to perform a method, including determining or predicting the reactions of other people in response to the emergency data, interpreting in real-time the reactions of the other people to physically impaired person according to the impaired person profile, determining a type and modality of aid services to the physically impaired, and prompting the physically impaired person one or more device for aid services.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 8 illustrates a signal-bearing storage medium for storing machine-readable instructions of a program that implements the method according to the example embodiment of the invention.

DETAILED DESCRIPTION OF PREFERRED EMBODIMENTS

Figure 1:
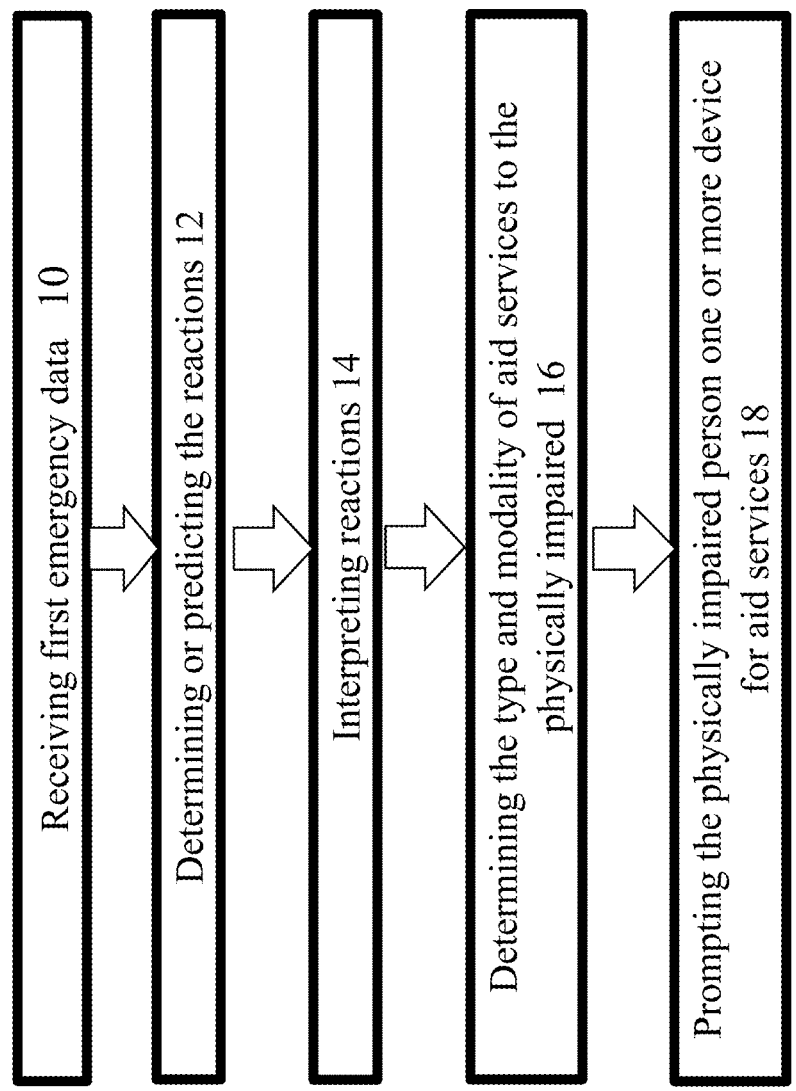
FIG. 1 illustrates a system of an example embodiment.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

As mentioned, physically impaired people are part of the workforces and are in any other places like other people and hence they require some level of aid or companions. There is much work and research being done to find ways to improve life for physically impaired people. Hearing, reading and recognition devices could make sensors, smartphones, tablets and smart glasses (powered by AI systems) into indispensable companions for the physically impaired.

As mentioned, there is a need to how to ensure real-time aid to physically impaired people during an emergency situation. Beyond providing real-time aids, progress is needed to equip the physically impaired individuals to quickly and instantaneously self-respond to typical emergency alarm systems installed at workplaces, other sites (e.g., shopping malls, restaurants, etc.) and other buildings in real-time and correctly as opposed to being left behind under emergency instances (e.g., fire).

In one example, there is an equipping of physically impaired people with computing and communication devices (e.g., IoT devices such as mobile phone, sensors, wrist watches, led lights, other specialized hearing-assisted and vision assisted devices, etc.) that are interfaced with emergency response system to ensure that they receive real-time messages/alerts at their fingertips. Such interfaced systems often translate, convert or interpret emergency response system sounds (e.g., an audio signal) into a suitable message or signal that deaf can see, feel and understand (e.g., via sign language video images indicative of the emergency alert) or a blind can hear, visualize and understand. For example, vibration in an instance of devices attached to the body like a wristwatch or a mobile phone in the pocket or flickering lighting on their computers or visible phones on their desk. Also, such interfaced systems and/or devices also broadcast the emergency data along with details of the physically impaired (e.g., identification, location, characteristics of the incident) to trained emergency response team so that they can be assisted accordingly.

However, witnessed by the inventors during emergency situations, different people react differently in response to an emergency situation to which a physically impaired person may be unaware, perhaps except the emergency message received by the interfaced system (if exist at the scene). This can cause physically impaired to react incorrectly as a result of reacting to other people's reactions. Such reactions may further mislead and can cause harm to the physically impaired ones (e.g., the individual with physical impairment may take a wrong response to the emergency situation).

Example methods and systems attempt to teach (i) understand the emergency situation, (ii) interpret the situation, (iii) generate and send/broadcast emergency message/alert (perhaps with some details about the emergency situation) to nearby subscribed devices belonging to physically impaired person (and an emergency response team or to physically impaired preferred contact list). The devices then process and translate the received message/alert according to the profile of the physically impaired person. Moreover, there are several sophisticated and smart IoT-enabled and AI-backed assistive devices in the market, for both hearing and visually impaired people. These devices come with a various degree of sensing and processing capabilities such as DC motors, GPS, Navigation, sensors, speech, recognition smart guidance system, etc. They provide navigation or hearing aid for blind or deaf which gives a sense of artificial vision or hearing by providing information about the environmental scenario of static and dynamic objects and/or (acoustic) sounds around them. Note that while these smart assistive devices address most of the physically impaired challenges, but their affordability by the general public is in question.

Moreover, various techniques disclosed in the enabling art teach systems, methods and devices/apparatuses to generate and transmit a personalized emergency evacuation plan, to generate and deliver situational-dependent incident responses related to an emergency, monitoring user reactions via eye tracking, mobile phone sensors, smartwatch, other wearable devices or inferring users' reactions associated with an emergency situation from social media (e.g., FACEBOOK, TWITTER, INSTAGRAM, etc.) and messaging applications.

However, such techniques fail to provide (i) predicting the different people reactions associated with the detected emergency situation, (ii) interpreting the different people reactions in response to the emergency situation, and (iii) aggregating and summarizing the interpreted messages which are streamed on physically impaired person's device while referencing to the first emergency message, while the present invention provides these and other benefits.

FIG. 1 illustrates an example embodiment. An example embodiment of the present invention discloses methods and systems for guiding a physically impaired during emergency based on real-time interpreting reactions of other people. The system 100 executes the processes including receiving first emergency data (e.g., a message) 10, determining or predicting the reactions of other people in response to the emergency data 12, interpreting in real-time the reactions of the other people to physically impaired person (due to a certain disability) according to the impaired person profile 14, determining the type and modality of aid services to the physically impaired 16, and then, prompting the physically impaired person one or more device for aid services 18.

Figure 2:
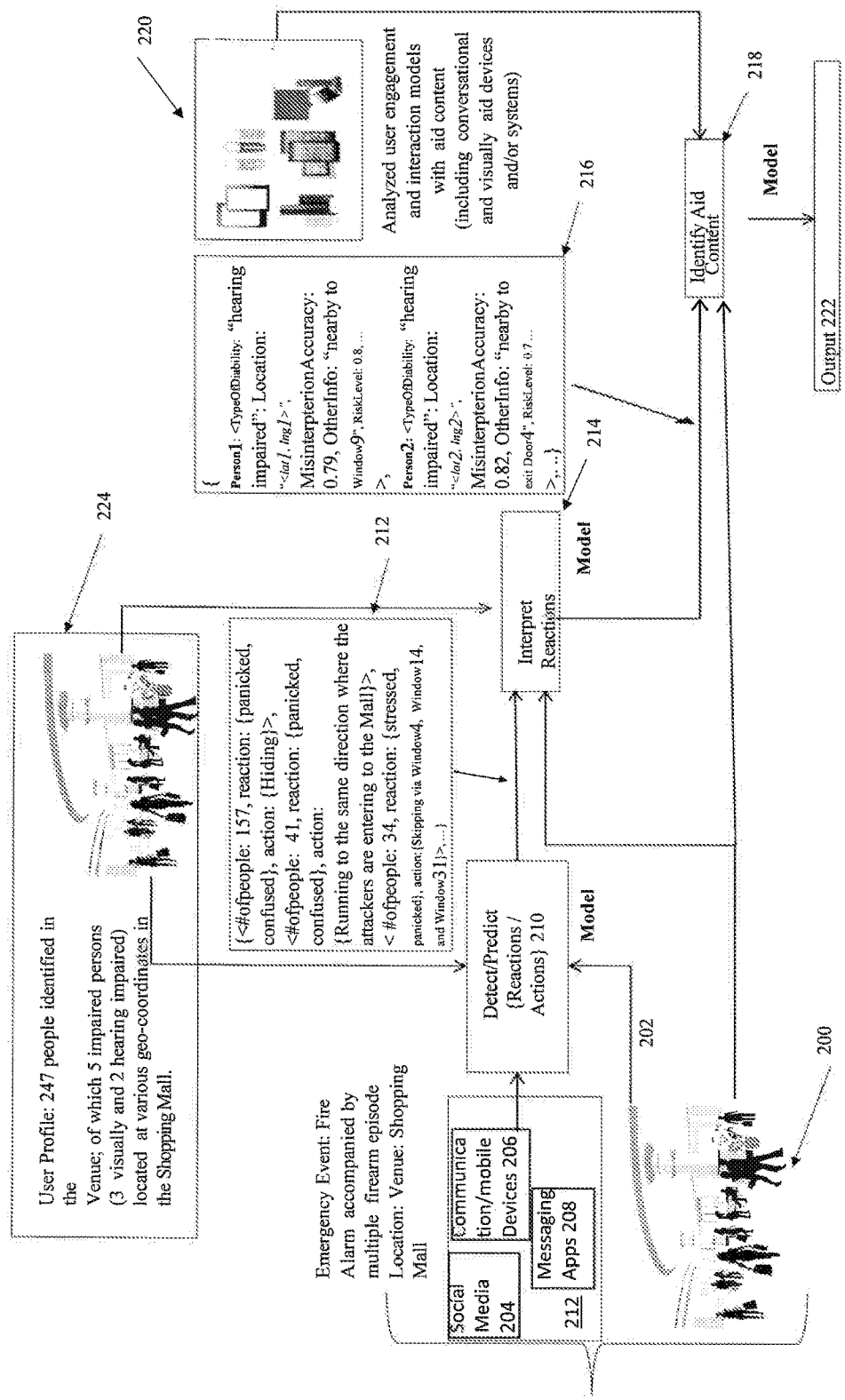
FIG. 2 illustrates an example scenario of an example embodiment.

To appreciate the disclosed invention, consider the following example scenario shown in FIG. 2. FIG. 2 illustrates an example scenario of an exemplary embodiment. In the example scenario, the system 100 received a signal (e.g., audio siren signal) 202 about fire accompanied by audio of multiple incidents of gunfire or other arms fire at a venue (e.g., shopping mall) 200. The signal is also broadcasted to those present inside and nearby the venue and subscribed to the system 100. The signal 202 is input for detection and/or prediction of reactions and actions 210.

Information from auxiliary devices or software 212 including eye tracking, mobile phone sensors, smartwatch, other wearable devices 204 or inferring users' reactions associated with an emergency situation from social media (e.g., FACEBOOK, TWITTER, INSTAGRAM, etc.) 206 and messaging applications (e.g., WHATSAPP, IMO, VIBER, etc.) 208 are also input for detection and prediction 210.

The System 100 already identified in module 224, 247 people in the venue 200 and of the 247, 5 (<Person1 to Person5>) of them are impaired persons (3 blind and 2 hearing impaired) located at various geo-coordinates in the venue (e.g., shopping mall) 200, based on signals received from their devices (e.g., mobile devices 206, messaging apps 208, etc.) upon receiving the fire episode signal 202 from the emergency system. Ceiling and wall-mounted loudspeakers installed in the venue 200 can be used as ultrasonic transmitters for occupancy sensing.

volutional neural network) model process stream data, e.g., from security camera networks installed at various locations in/outside of the venue 200. These are inferred from generated list of environment information based on the LSTM (long-short term memory) and CNN (convolutional neural network) trained outputs: E={alarm_type: fire alarm, crowd_state: panicking, groups: trajectory of all groups in the Venue}.

The system 100 also identified that the ongoing actions (i.e., responses to the emergency situation) that the majority of the non-physically impaired people (subset of 242 people) are taking wrong responses to the detected emergency situation.

The System 100 interpreted above reactions and actions in module 214 and generates predicted values for each of the impaired person. Input of information from the detect/predict module 210 and also from the information directly from the venue 200 and also the auxiliary information 212 is provided to the interpret reactions module 214. For example, there will be 82.5% chance that one of the hearing-impaired persons close to one of the emergency exit doors could potentially react incorrectly as a result of the reactions and actions of the other people (e.g., they may take a wrong response to the emergency situation). An example of the payload generated for each of the impaired person may look like as shown for output 216:

```
{
    Person1: <TypeOfDisability: "hearing impaired": Location: "<lat1, lng1>",
MisinterpterionAccuracy: 0.79, OtherInfo: "nearby to Window9", RiskLevel: 0.8, ... >,
    Person2: < TypeOfDisability: "hearing impaired": Location: "<lat2, lng2>",
MisinterpterionAccuracy: 0.82, OtherInfo: "nearby to exit Door4", RiskLevel: 0.7, ... >,
    Person3: <TypeOfDisability: "hearing impaired": Location: "<lat3, lng3>",
MisinterpterionAccuracy: unknown, OtherInfo: null, RiskLevel: unknown, ... >,
    Person4: <TypeOfDisability: "Blind": Location: "<lat4, lng4>",
MisinterpterionAccuracy: 0.69, CrowdNoiseLevel: 0.96, OtherInfo: "nearby exit Door2",
RiskLevel: 0.82, ... >,
    Person5: {TypeOfDisability: "Blind": Location: "<lat4, lng4>",
MisinterpterionAccuracy: 0.74, CrowdNoiseLevel: 0.98, OtherInfo: "200 meter away from Exit
Door4", RiskLevel: 0.6, ... >
}
```

The System 100 detected various reactions of people in response to the emergency signal 202. The output 212 of detected and/or predicted reactions and reactions module 210 can be as follows.

Output 212:
{<#ofpeople: 157, reaction: {panicked, confused}, action: {Hiding}>,
<#ofpeople: 41, reaction: {panicked, confused}, action: {Running to the same direction where the criminal individuals are entering to the venue}>,
<#ofpeople: 34, reaction: {stressed, panicked}, action: {Skipping via Window4, Window14, and Window31}>, . . . } and the rest of the people are in unknown state of reactions.

As shown in the above output 212, the detected reactions includes 157 people that have a reaction of panicked and confused with an action of hiding, 41 people with a reaction of panicked, confused, action of running to the same direction where the criminal individuals are entering to the venue, 34 people with a reaction of stressed, panicked, action of Skipping via window number 4, window 14, and window 31, and the rest of the people are in unknown state of reactions.

This is done in real time using the Reaction Monitor and Predictor 210 where the LSTM (long-short term memory) model process the sensory data from the user's smartphone 206 and other auxiliary input 212 such as the CNN (con- As shown in output 216 above, the type of disability is noted, along with misinterpretation accuracy, crowd noise level, and risk level. Additionally, other information such as distance from emergency/exit doors or certain windows can also be noted.

The System 100 translated the interpreted reactions and associated actions to impaired user accordingly as shown in output 216.

The System 100 selected the right aid content according to each impaired user profile from the identify aid content module 218. Module 220 analyzes user engagement and interaction models with aid content (including conversational and visually aid devices and/or systems) which is provided to the identify aid content module 218.

An example of aid content is as follows as output 222:

System 100 generated the optimal path for person X (less transited and short path), based on data from E and Emergency guidelines database: P={path: set of coordinates from position of person X (GPS) to emergency door H, recommendation: "to crawl (due to the smoke)"} in the [Reaction Summarizer & Aggregator] module;

System 100 generated instructions to Person X using voice (due that from the user profile database states that he is blind), the content says {"Please walk ten steps to your left, mind the steps there, and then take twenty steps to your right, you will find the exit door H. Smoke was detected so please do these steps crawling. Remember, "Get low and Go!"};

System 100 received "I'm lost" from the microphone. Obtain GPS location and updated the path and instructions for person X.;

System 100 generated instructions to Person X using, the content says {"You are doing it great! Almost there. Make two more steps straight and then twenty steps to your right! Get low and Go!"}

This output 222 can be provided to individuals at the venue (e.g., shopping mall) 200.

Figure 3:
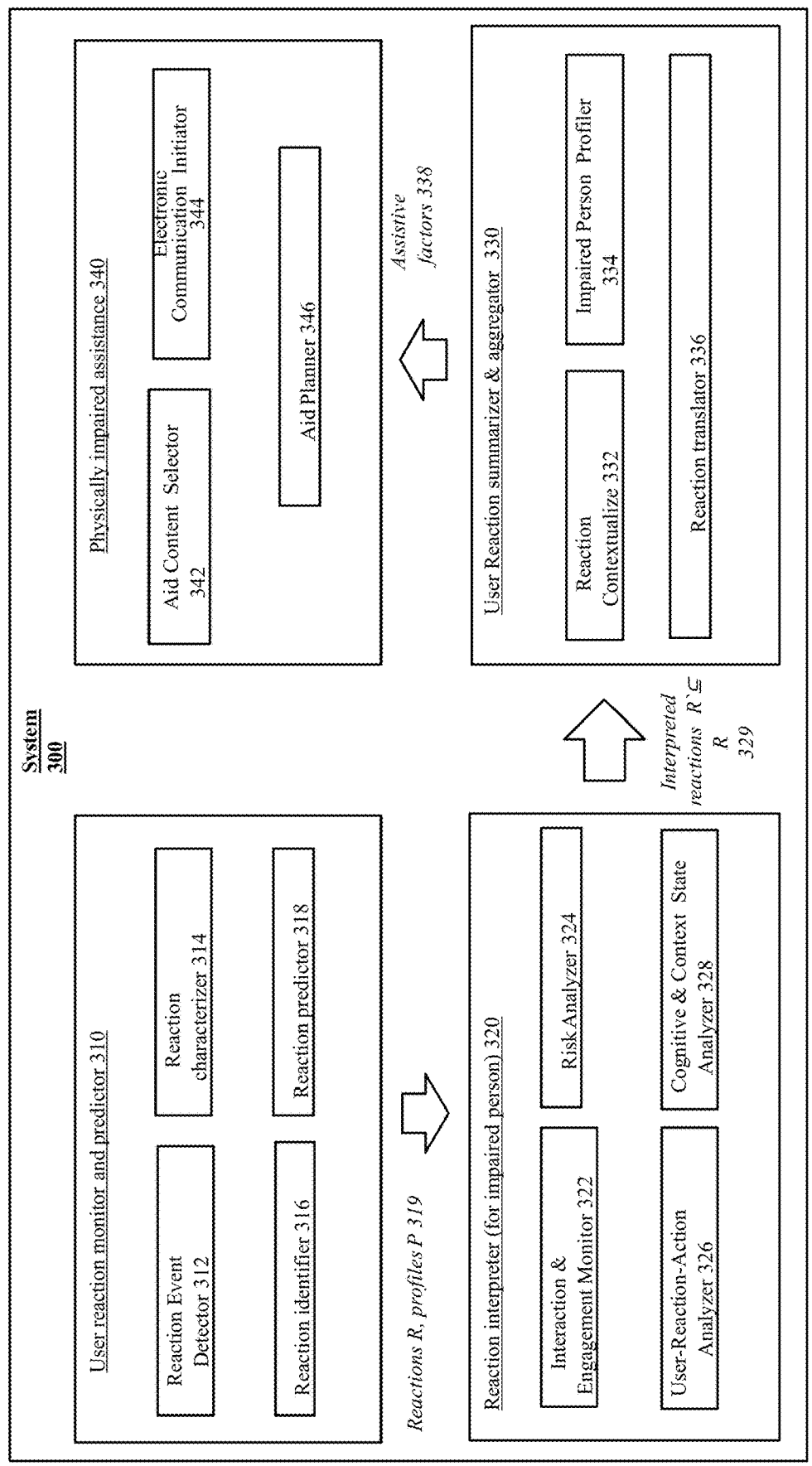
FIG. 3 illustrates block diagram illustrates components of a computing system for dynamically interpreting reactions of other people for physically impaired person during an emergency.

FIG. 3 illustrates block diagram illustrates components of a computing system for dynamically interpreting reactions of other people for physically impaired person during an emergency.

FIG. 3 depicts a computing system 300 that includes an aid planner platform for physically impaired person duration emergency situation with a set of subscribing user communication devices 206 (e.g., phone, specialized sensor-based assistive devices, etc.) for assisting a user or a group of users in aiding (including interpreting reactions of other people) hearing or visually impaired persons during emergency situations. The system 300 includes reaction/action identifier module 310 to identify and predict at least one reaction or action associated with a user in response to an emergency event in a crowed location (e.g., Shopping Mall), reaction interpreter module 320 that interprets the significance of the reaction to visually and hearing impaired people present at the location and/or generates risk scores accordingly based on various measures (e.g., cognitive and contextual states, characteristics of the emergency event, location characteristics, etc.), reaction summarizer module 330 to aggregate reactions and translate according to each impaired person profile, and an aid assistant trigger module (or physically impaired assistance module) 340 selects/generates personalized aid content to the impaired person and determines the contextual aspects of the contents based on reactions of the user or predicts one or more factors to trigger the aid modulation module.

Figure 4:
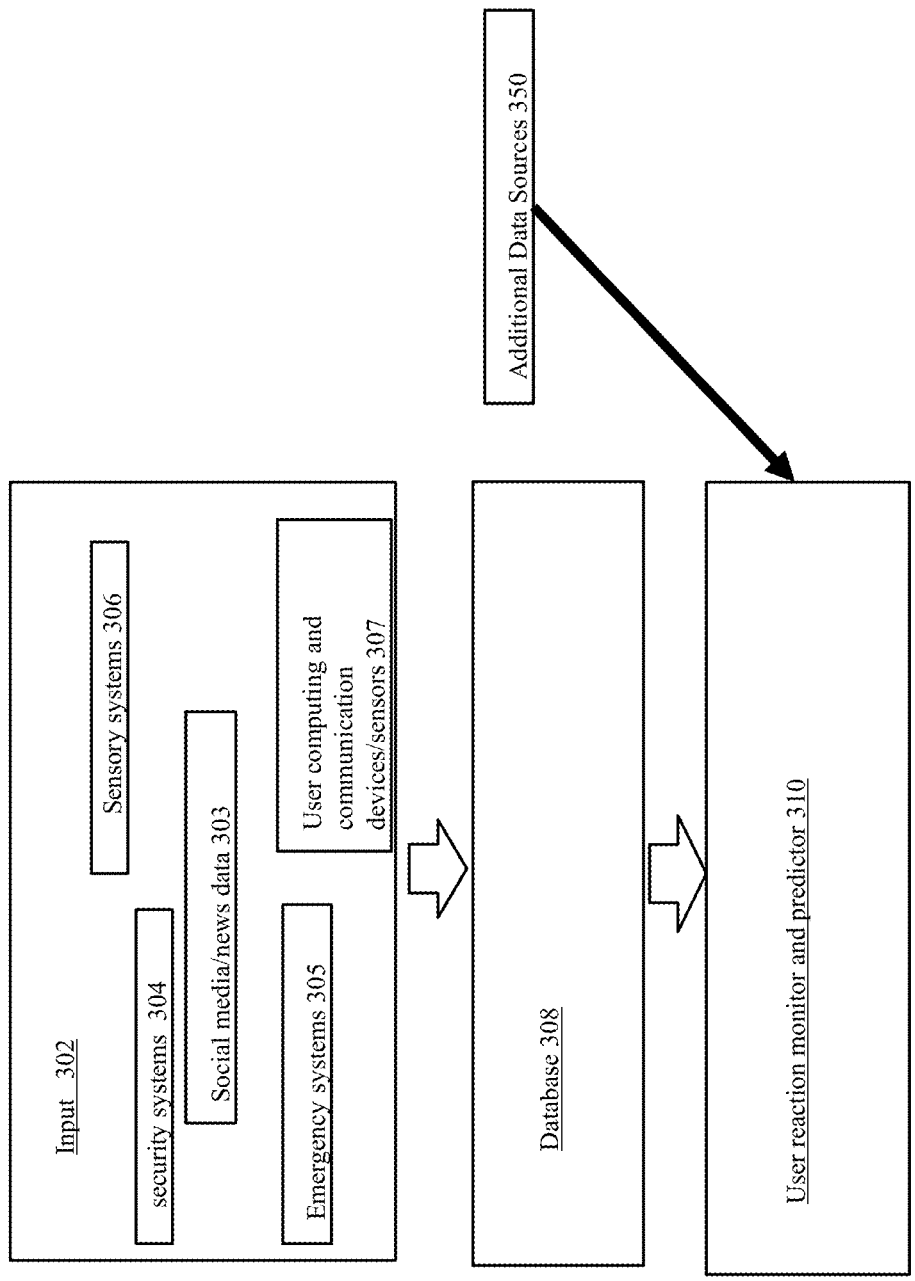
FIG. 4 illustrates a further detail of computing system of FIG. 3.
}

FIG. 4 illustrates a further detail of computing system of FIG. 3. The system 300 may be configured with input modules 302 of security 304 emergency 305 and/or sensory systems 306 and with one or more user computing and/or communication devices 307 which are triggered to instrument/monitor/collect data when an emergency incident is detected or received by one of these devices. The data collected (e.g., text, video, audio and image content) from these instrumented systems/devices/apps are stored on a "reaction database" 308. The information in the reaction database 308 can be accessed by the user reaction monitor and predictor module 310.

The data in the reaction database 308 are geotagged. In one scenario, data collected from these pluralities of instrumented sources can also be corroborated using social media data and news reports 303. The disclosed system 300 may be inferenced with and/or receive/send data from/to:

Security systems 304: These systems will include details of access in the building by people and security camera feeds. This will provide information about the people coming in and out of the building.

Emergency systems 305: These include fire and security alarm systems that will go off when an emergency has been trigged (e.g., in the building). These can also provide area schematics and emergency escape plans. Once an emergency has been detected, such systems can be automatically activated. Note that an emergency can be detected by a security personnel activating an alarm or automatically by analysis and verification of social media posts about an ongoing emergency.

Sensor systems 306: These include sensors like smoke detectors, temperature, air quality that monitor various factors of a building, for instance.

User computing and communication devices/sensors 307: These include devices/sensors used by physically impaired users and other people, e.g., GPS, Gyroscope, voice, mobile phone, wrist watches, heart rate, touch sensor, camera sensor, physiological sensors such as implanted heartbeat, recorded conversational data etc.

Referring back to FIG. 3 and FIG. 4, in one embodiment, identifying at least one reaction associated with users based on the instrumented data 302 and plurality of other data sources (e.g., historical user reactions, real-time social media data, crowdsourcing, etc.) 350. To do so, the system 300 trains machine learning models (e.g., training a deep learning algorithm, sentiment analysis models) that will extract, detect, characterize and recognize emotions from text, video or audio data by cross-referencing across the six (6) emotion categories of (1) anger, (2) disgust, (3) fear, (4) happiness, (5) sadness and (6) surprise, that are widely used to describe humans' basic emotions. The system 300 may also learn the possible actions a user will take or has taken in response to detected emotions. Various sentiment analysis methods can be used to understand user sentiment trends based on detected emotional characteristics.

Referring to FIGS. 3 and 4, the system 300 receives input signals (e.g., input module 302) for processing in the User reaction monitor and predictor 310. The User reaction monitor and predictor 310 includes a reaction event detector 312 to detect the reaction event, a reaction identifier 316 to identify the reaction, a reaction characterizer 314 to characterize the reaction, and a reaction predictor 318 to predict the reaction. From the user reaction monitor and predictor 310, an output of the reactions R and profiles P of the individuals monitored 319 is output to the reaction interpreter 320. The reaction interpreter 320 includes an interaction and engagement monitor 322, a user-reaction-action analyzer 326, a risk analyzer 324, and a cognitive and context state analyzer 328 to interpret reactions (R'⊆R) 329, which is fed to the User Reaction summarizer & aggregator 330.

The User Reaction summarizer & aggregator 330 includes a Reaction Contextualize 332, an Impaired Person Profiler 334, and a Reaction translator 336 to process the interpreted reactions 329. The User Reaction summarizer & aggregator 330 outputs assistive factors 338 to the Physically impaired assistance module 340. Physically impaired assistance module 340 includes an Aid Content Selector 342, Electronic Communication Initiator 344, and an Aid Planner 346 to process the assistive factors 348 to output aid content (See output 222 in FIG. 2).

Figure 5:
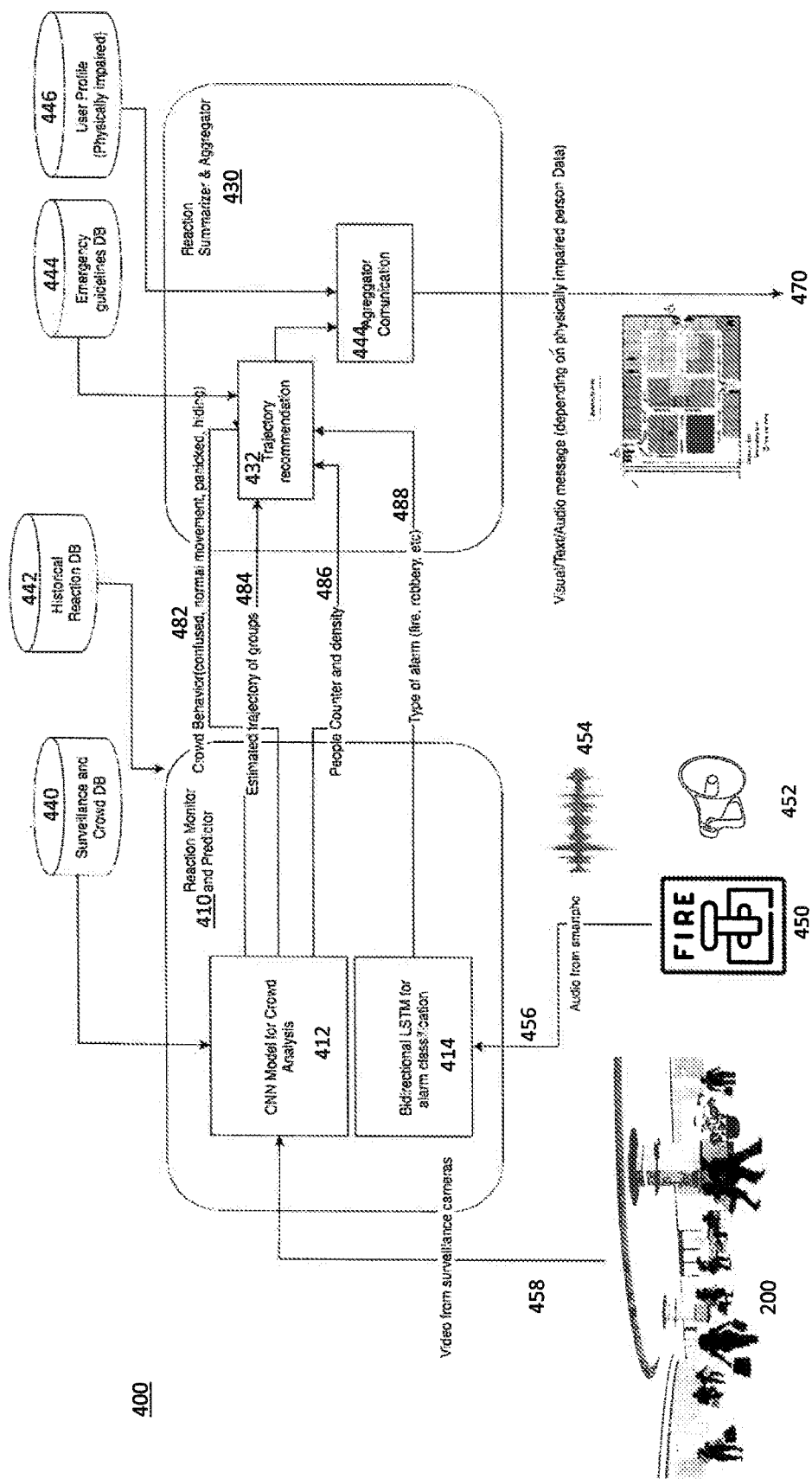
FIG. 5 illustrates an implementation of the example embodiment.

FIG. 5 illustrates an implementation of the example embodiment.

In one implementation in FIG. 5, while referring to FIG. 4, in the system 400, the reaction monitoring module 410 may employ a trained Convolutional Neural Networks (CNN) model 412 and a trained LSTM model 414. The LSTIM 414 can be bidirectional for alarm classification. The CNN model 412 is used for crowd analysis that uses as input; surveillance images resized to smaller shape. During training the labeled data contains several target attributes.

First, the system 400 has the amount of people in the picture (e.g., image of the shopping mall venue 200) 458 (e.g., video from surveillance cameras), to be able to infer count and density.

Second, the system 400 processes Image data with labeled behavior (such as panic, confuse, normal, etc.) and third, trajectory vectors over the same images, to estimate where the group of people is moving. With these labeled data, the system 400 trains the CNN (Convolutional neural networks) model 412 to obtain as an output: type of behavior 482 (crowd behavior (e.g., confused, normal movement, panicked, hiding, etc.)), location and density estimation of people (people counter and density 486). Additionally, the system 400 provides the estimated trajectory of groups 484, so that the system 400 can provide the best trajectory for the physically impaired user to take during the emergency. Surveillance and crowd information in database 440 is sent to the CNN model. Historical reaction data in database 442 is also accessed by the reaction monitor and predictor 410.

The system may use bidirectional LSTM model 414 for alarm classification. The model 414 may take audio recorded in "real time" 456 from the smartphone device 206, 307 and classify the type of alarm. During the training stage of this model 414, the system 400 prepares the audio data for the LSTM 414 by splitting the sound obtained by the audio data 454 sources (e.g., microphone in the smartphone device 206, 307) into a signal part where alarms 450, 452 are audible and a noise part where no alarm is present (background noise). The system 400 then computes the spectrograms of both parts and split each spectrogram into equally sized batches. Each batch can be seen as the spectrogram of a short time interval (typically around 4 seconds). Each batch is a sample for training/testing for the LSTM model 414. The LSTM model can then output the type of alarm (e.g., fire, robbery, etc.) 488.

Similarly, the system 400 further identifying at least one action and/or activity associated with the identified reaction of a user based on the instrumented data and plurality of other data sources (e.g., historical user reactions, real-time social media data, crowdsourcing, etc.). The system 400 may analyze camera feeds in parallel to determine the numbers and actions of people in the various floors and locations in the building (e.g., venue 200 of FIG. 2). The system 400 may detect and tag the activities of people based on what they are doing, body language and their facial expressions.

The outputs of the CNN model 412 and the LSTM model 414 are used for trajectory recommendation 432 in the reaction summarizer and aggregator module 430. The emergency guidelines are accessed by the aggregator module from database 444. The reaction is summarized and aggregated as an output signal 470 such as a visual/text/audio message depending on the physical impaired person data accessed for example, from the user profile of physically impaired from database 446.

People detected to be running, crawling on the floor would be tagged as trying to aware of emergency and trying to escape.

People detected hiding behind doors or under furniture will be tagged as aware of emergency and trying to hide.

People detected doing normal activities like casually walking, seated in a meeting room with normal body language and facial expressions will be tagged as unaware of the emergency.

For example, for people that are aware of an emergency and are observed running in a hallway, the system 400 may predict that they may access the nearest exit. The system 400 would the collate the status of the whole building based on the awareness of individuals of the emergency and their current activities.

The detected or predicted reactions and actions/activities associated with people are further characteristics such as type of crowd behavior, groups and their trajectories, people density and approximation count and the source of the alarm.

For each identified, detected and predicted reaction r in R, the system 400 interprets the reaction and associated action taken by the individuals using a plurality of machine learning algorithms including signal processing, facial recognition, NLP (natural language processing) on text data, social media analytics, sentiment analysis, touch sensing, emotion analysis, etc. The method of interpreting reactions further including assessing and characterizing user-reaction-action, inferring the cognitive and contextual situation of each user, analyzing the interaction/engagement of the user with other users, with devices, etc.

In one embodiment, a risk level to each impaired person is computed based on profile, previous reaction-actions pairs, etc. The method further generating predicted risk values for each of the impaired person. For example, there will be 82.5% chance that one of the hearing-impaired persons close to one of the emergency exit doors could potentially react incorrectly as a result of the reactions and actions of the other people (e.g., they may take a wrong response to the emergency situation).

Through the analysis of the reactions by the reaction interpreter module (e.g., 320 in FIG. 3), the system 100, 300, 400 may predict or detect whether the physically impaired person to react incorrectly as a result of reacting to other people's reactions and then estimating whether the reactions may mislead the physically impaired person, e.g., causing harm such as the user can take a wrong response to the emergency situation.

In one example, equipping physically impaired people with computing and communication devices (e.g., IoT (Internet of Things) devices such as mobile phone, sensors, wrist watches, LED (light emitting diodes) lights, other specialized hearing-assisted and vision assisted devices, etc.) that are interfaced with emergency response system to ensure that they receive real-time aggregated, summarized and contextualized messages/alerts at their fingertips.

The system 100, 300, 400 further correlating aggregated reactions with emergency guidelines 444 of the location (these guidelines contains structured protocols and blueprints of the building), coupled with the outputs from the reaction monitor and predictor 410 (type of crowd behavior, groups and their trajectories, people density and approximation count and the source of the alarm).

The aggregated and summarized reactions (from module 430) are then translated and converted according to each impaired person. The impaired assistance module 340 (See FIG. 3) selects or generates aid contents. By a way of an aid content example is the system generating an optimal path to get the impaired person to a safe location using a rule-based system. The path serves as an input to the electronic communication initiator module along with the user data.

The system 100, 300, 400 may be trained to determine the most efficient and safe actions to be undertaken by the physically impaired person taking into account the following constraints:

The type of disability of the individual: Based on the disability of the person it recommends the route that they will be able to take. For example, direct a person in a wheel chair towards a ramp instead of a stairway.

Presence of other people near the physically impaired person: The system 100, 300, 400 may identify whether the impaired person (blind or deaf) is alone or with someone (e.g., with family, colleagues, and friends). The system may learn to establish the trust relationships between the impaired person and those who accompanied them. Since during an emergency situation, they often follow what they are doing. Therefore, the disclosed system can channel the reactions of the "trusted" individuals to the impaired person.

Current location of the emergency: The recommended action should take into account the current location of the emergency and the predicted spreading. E.g. for a fire, avoid areas where the fire/smoke will spread to next.

Building schematics and emergency plans: The recommended action should take into account the escape plans and assembly points to ensure that the person can be easily rescued by first responders who will follow such procedures.

In case the aid assistance service recommends instructions, which may be differed from what everyone else's doing, for example, the scenario where a large number of people was actually running towards the danger, in which case, the system would advise the opposite. But it may be natural to assume that the people around the impaired person (blind or deaf) who can see what's happening are making the right decision (reaction/action), because the impaired person has no idea of the limitations in their information. The system may automatically determine such conflict and generate more reassuring notification messages with greater details.

Based on the incident or emergency events, e.g., in the case of a terror attack, where exiting the premises may not be an option, the aid content selector may recommend where to hide, e.g., bathrooms, shops, behind counters.

The system 100, 300, 400 may build appropriate notifications for the impaired person on their communication or assistive devices e.g., mobile phone. This will allow deaf to see, feel and understand (e.g., via sign language video images indicative of the reaction, aid content as well as emergency alert) or a blind to hear, visualize and understand. Based on the risk score if higher than a certain threshold, the intensity and nature of the notification may change on the user computing or communication devices. For example, specific vibration in an instance of devices attached to the body like a wristwatch or a mobile phone in the pocket or flickering lighting on their computers or visible phones on their desk. The devices used by the impaired person can be configured to broadcast the emergency data along with details of the physically impaired (e.g., identification, location, characteristics of the incident) to trained emergency response team or family members so that they can be assisted accordingly.

For example, based on the type of disability and the available devices they have on them, the system 100, 300, 400 may send the appropriate notification to the person.

A person who cannot hear would get a vibration in their wearable or the flash in the mobile phone camera would turn on or flash to draw their attention to their mobile phone where the recommended course of action would be displayed.

A person who cannot see would get an audible warning, followed by a read out of the recommended course of action.

Figure 6:
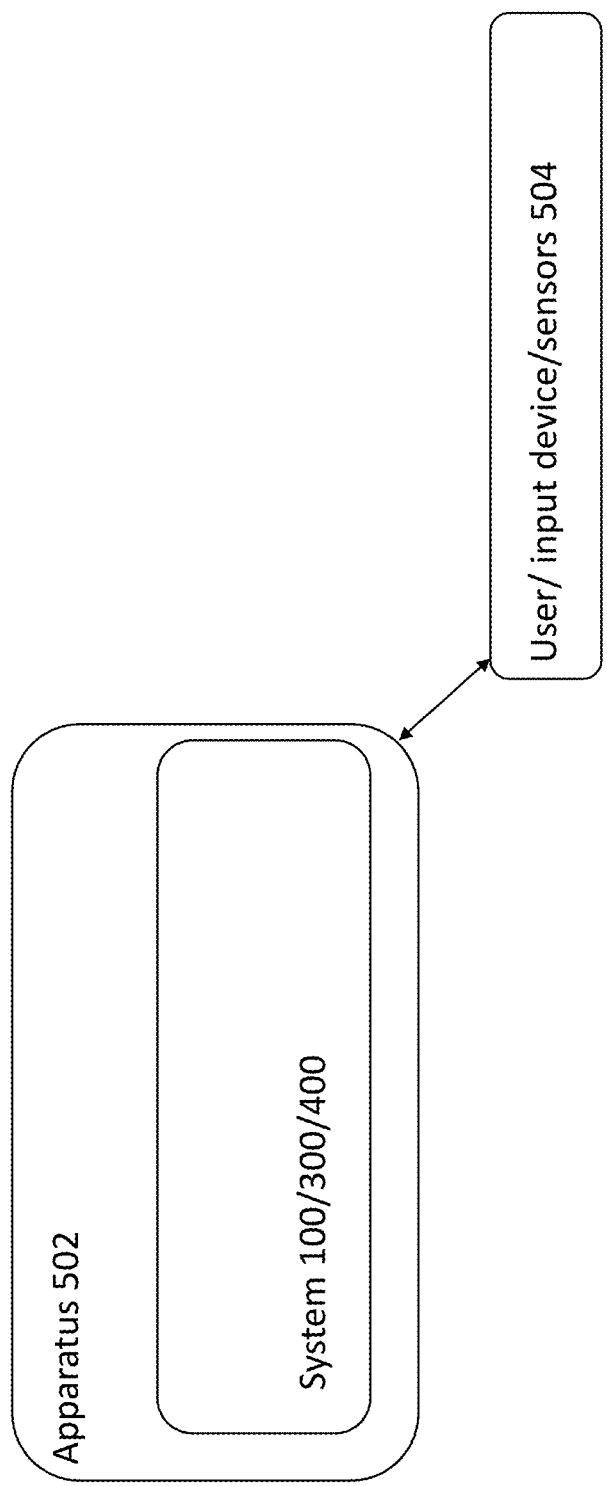
FIG. 6 illustrates an example configuration of the example embodiment.

FIG. 6 illustrates an example configuration of the example embodiment. The system 100, 300, 400 is included into an apparatus 502, which receives input from the outside from sensors, a user, or other input device 504.

The system 100, 300, 400 executes the processes including receiving first emergency data (e.g., a message), determining or predicting the reactions of other people in response to the emergency data, interpreting in real-time the reactions of the other people to physically impaired person (due to a certain disability) according to the impaired person profile, determining the type and modality of aid services to the physically impaired, and then, prompting the physically impaired person one or more device for aid services.

Figure 7:
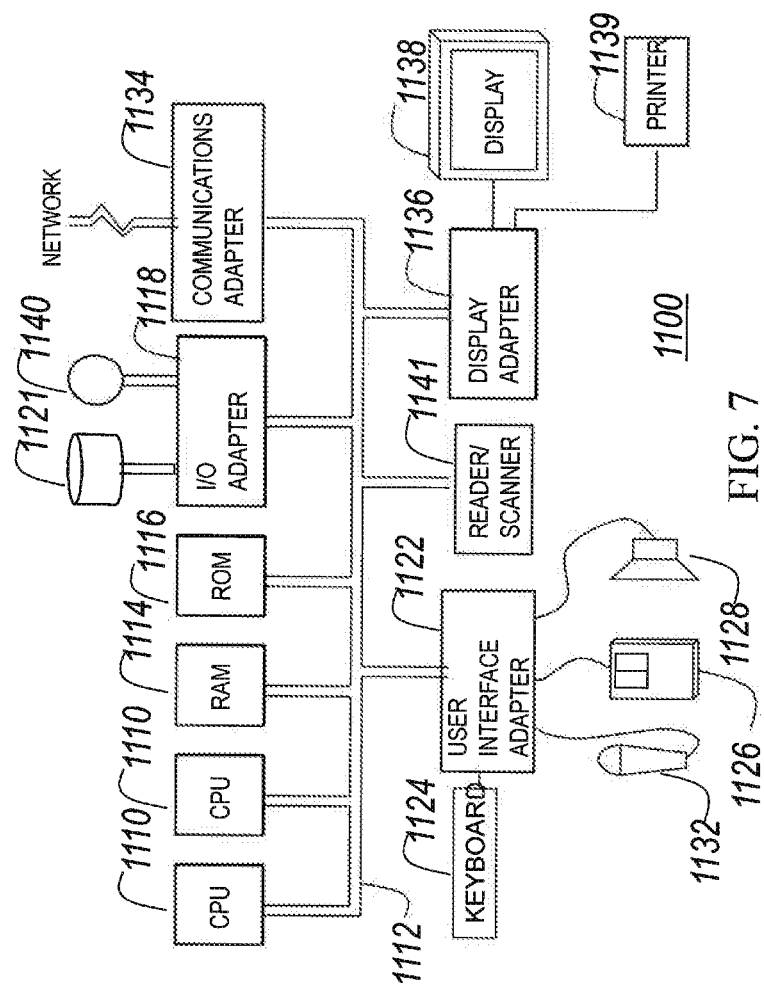
FIG. 7 illustrates an exemplary hardware/information handling system for incorporating the example embodiment of the invention therein.

FIG. 7 illustrates another hardware configuration of the system 100, where there is an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RANI contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 8), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
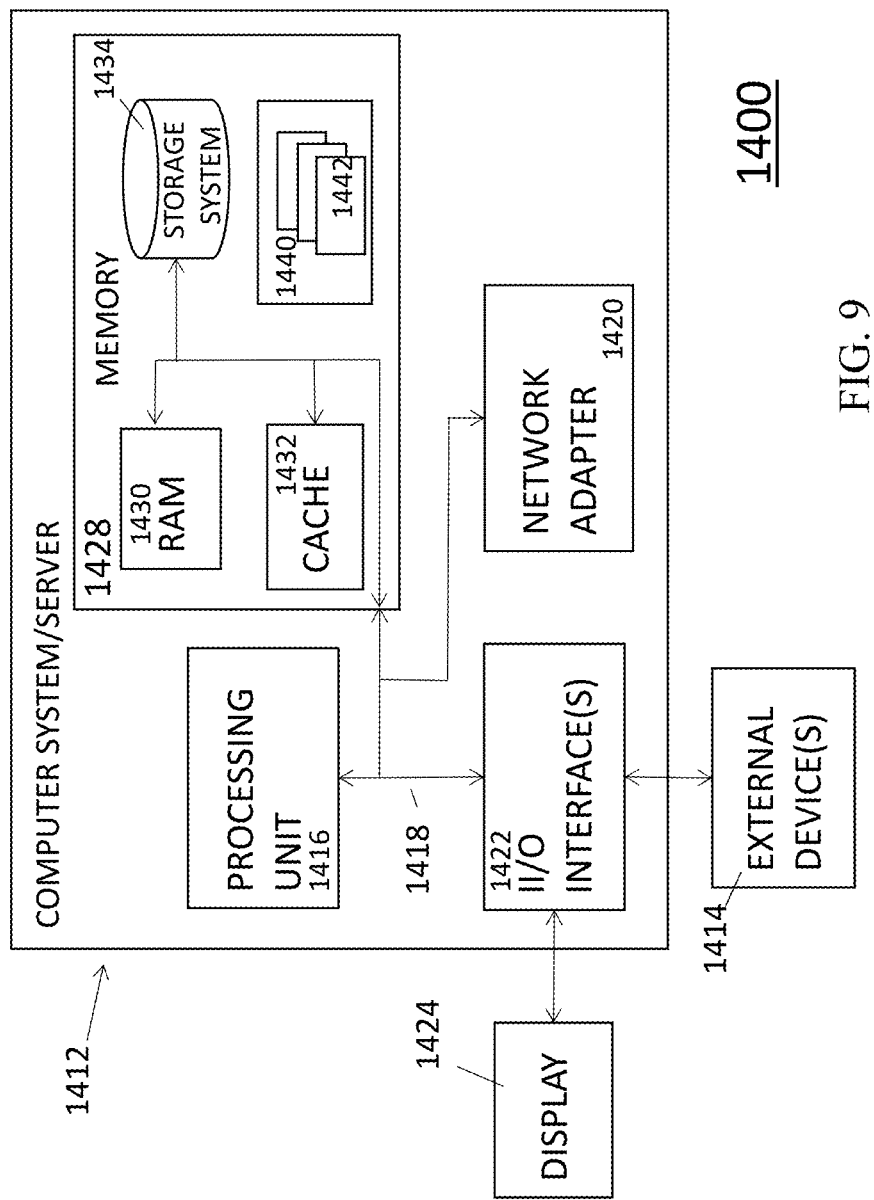
FIG. 9 depicts a cloud computing node according to an example embodiment of the present invention.

Referring now to FIG. 9, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 10:
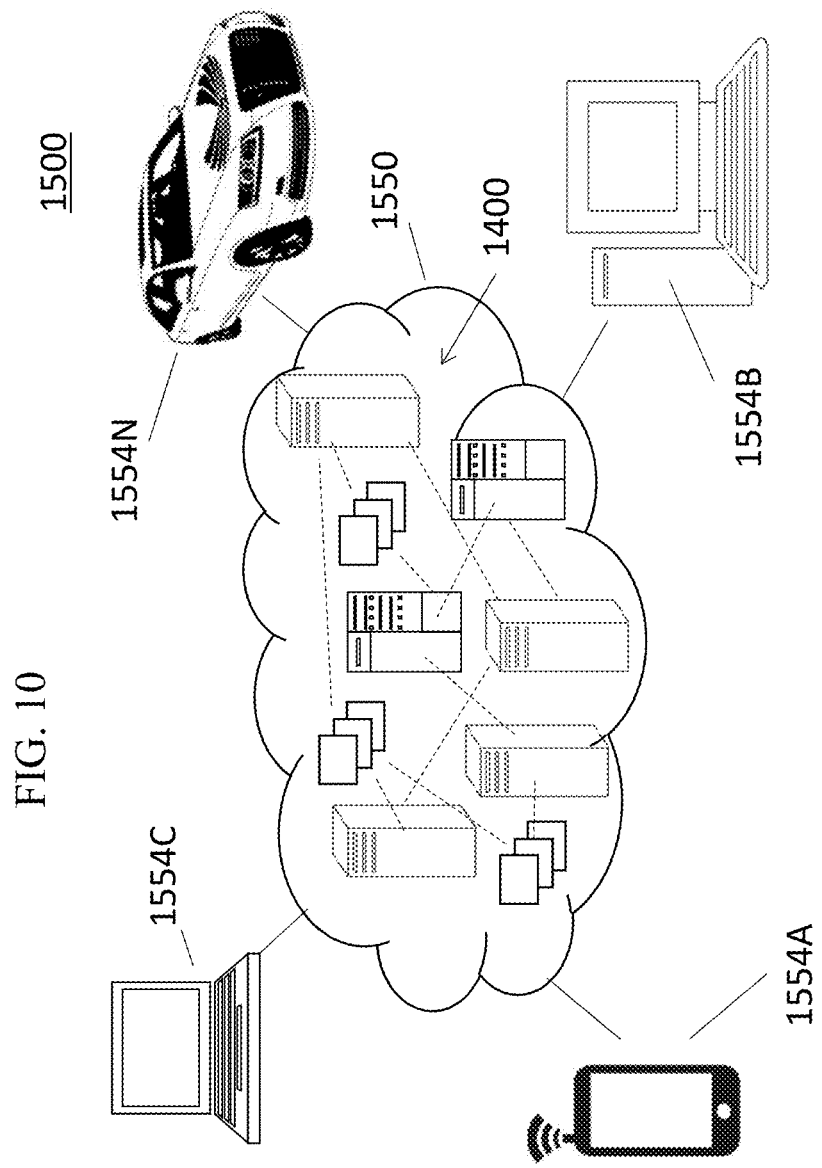
FIG. 10 depicts a cloud computing environment according to an example embodiment of the present invention.

Referring now to FIG. 10, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 10 are intended to be illustrative only and that computing nodes 1400 and cloud computing environment 1550 can communicate with any type of computerized device over any type of network and/or network addressable connection (e.g., using a web browser).

Figure 11:
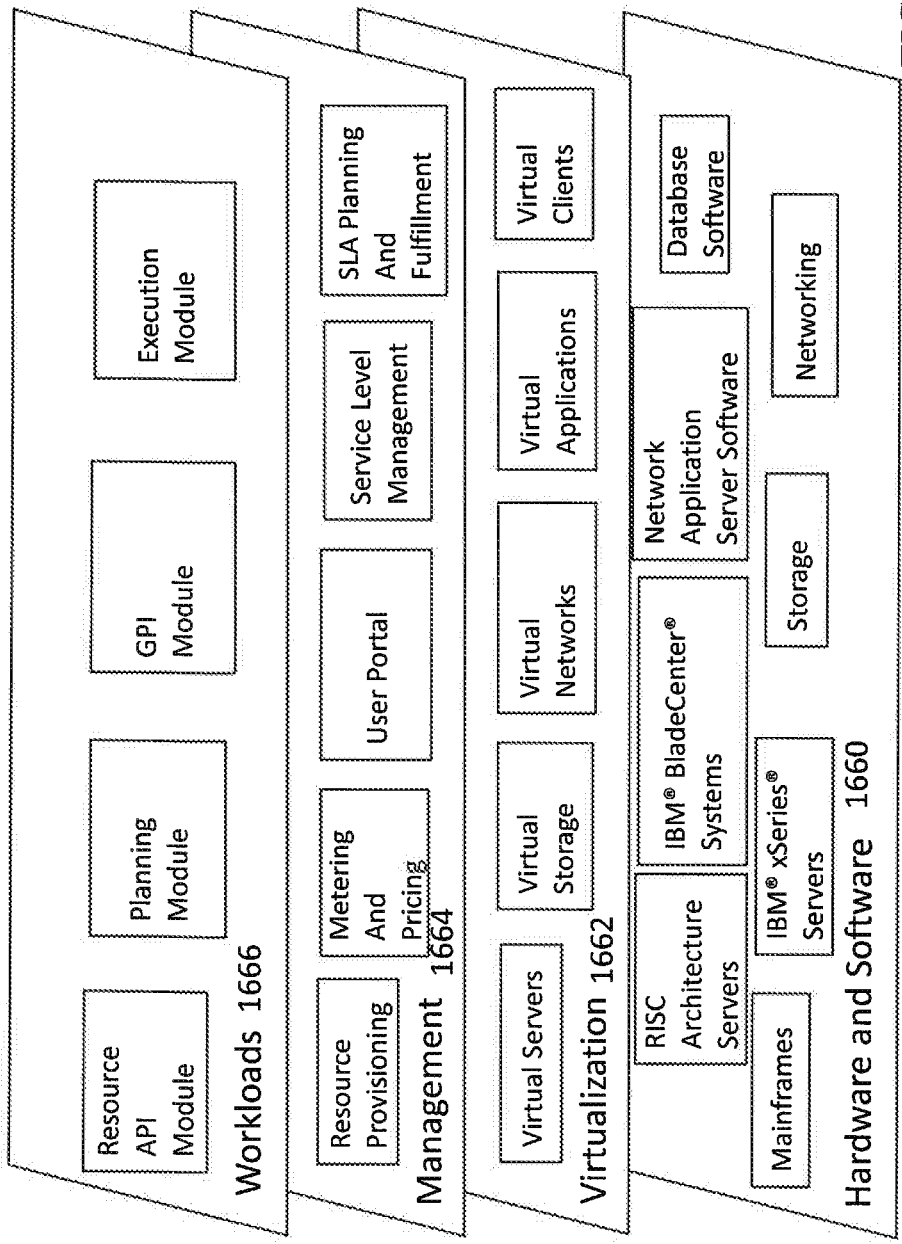
FIG. 11 depicts abstraction model layers according to an example embodiment of the present invention.

Referring now to FIG. 11, a set of functional abstraction layers provided by cloud computing environment 1550 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method for guiding a physically impaired individual during an emergency, comprising:
   receiving emergency data;
   determining or predicting the reactions of other people in response to the emergency data;
   interpreting in real-time the reactions of the other people to one or more physically impaired persons according to a physically impaired person profile;
   predicting the physically impaired person to react incorrectly, based on analyzing the one or more interpreted reactions;
   determining a type and modality of aid services to the physically impaired person according to the interpreting and predicting; and
   prompting the physically impaired person through one or more devices for aid services.

2. The method of claim 1, wherein the other people reactions include confused, stressed, panicked, skipping, and hiding, and
   wherein a risk level of each one of the physically impaired persons is computed to interpret the reactions.

3. The method of claim 1, further comprising characterizing the determined or predicted reactions and actions and activities associated with reactions based on the inferred type of crowd behavior, groups and their trajectories, people density and approximation count and a source; and
   generating predicted values for each one of the physically impaired persons to perform the interpreting.

4. The method of claim 1, further comprising determining the one or more interpreted reactions causing to mislead the physically impaired person.

5. The method of claim 1, further comprising computing a risk level to each physically impaired person based on profile and previous reaction-actions.

6. The method of claim 1, further comprising configuring devices used by the physically impaired person to broadcast emergency data along with details of the physically impaired person to trained emergency response team or family members so that they can be assisted accordingly.

7. The method of claim 1, further comprising determining the most efficient and safe actions to be undertaken by the physically impaired person.

8. The method of claim 1, further comprising identifying whether the physically impaired person is alone or with someone.

9. The method of claim 1, further comprising establishing trust relationships between the physically impaired person and those who accompanied them.

10. The method according to claim 1 being cloud implemented.

11. A system for guiding physically impaired, comprising:
    a memory storing computer instructions; and
    a processor configured to execute the computer instructions to:
    receiving emergency data;
    determining or predicting the reactions of other people in response to the emergency data;
    interpreting in real-time the reactions of the other people to at least one physically impaired person according to a physically impaired person profile;
    characterizing the determined or predicted reactions and actions and activities associated with reactions based on the inferred type of crowd behavior, groups and their trajectories, people density and approximation count and a source of an alarm;
    predicting the physically impaired person to react incorrectly, based on analyzing the one or more interpreted reactions;
    determining a type and modality of aid services to the physically impaired person according to the interpreting and predicting; and prompting the physically impaired person through one or more devices for aid services.

12. The system according to claim 11, wherein the other people reactions include confused, stressed, panicked, skipping, and hiding, and further comprising characterizing the determined or predicted reactions of the other people based on the inferred type of crowd behavior.

13. The system according to claim 11, further comprising:

determining the one or more interpreted reactions causing to mislead the physically impaired person;

computing a risk level to at least one physically impaired person based on the physically impaired person profile and previous reaction-actions;

configuring devices used by the physically impaired person to broadcast emergency data along with details of the physically impaired person to trained emergency response team or family members so that they can be assisted accordingly;

determining the most efficient and safe actions to be undertaken by the physically impaired person;

identifying whether the physically impaired person is alone or with someone; and establishing trust relationships between the physically impaired person and those who accompanied them.

14. A computer program product comprising a computer readable storage medium having program instructions embodied therewith, the program instructions readable and executable by a computer to cause the computer to perform a method, comprising:

receiving emergency data;

determining or predicting the reactions of other people in response to the emergency data;

interpreting in real-time the reactions of the other people to at least one physically impaired person according to a physically impaired person profile;

characterizing the determined or predicted reactions and actions and activities associated with reactions based on the inferred type of crowd behavior, groups and their trajectories, people density and approximation count and a source of an alarm;

predicting the physically impaired person to react incorrectly based on analyzing the one or more interpreted reactions;

determining a type and modality of aid services to the physically impaired person according to the interpreting and predicting; and prompting the physically impaired person via one or more devices for aid services.

15. The computer program product according to claim 14, further comprising:

determining the one or more interpreted reactions causing to mislead the physically impaired person, and computing a risk level to at least one physically impaired person based on the physically impaired person profile and previous reaction-actions.

16. The computer program product according to claim 14, further comprising:

configuring devices used by the physically impaired person to broadcast emergency data along with details of the physically impaired person to trained emergency response team or family members so that they can be assisted accordingly; and determining the most efficient and safe actions to be undertaken by the physically impaired person.

17. The computer program product according to claim 14, further comprising:

identifying whether the physically impaired person is alone or with someone; and establishing trust relationships between the impaired person and those who accompanied them.

* * * * *